United States Patent [19]
Agui

[11] 3,799,321
[45] Mar. 26, 1974

[54] APPARATUS FOR ASSEMBLING GROUPS OF STORAGE BATTERY PLATES

[75] Inventor: Eizo Agui, Takatsuki, Japan

[73] Assignee: Yuasa Battery Company Limited, Takatsuki, Japan

[22] Filed: Feb. 22, 1972

[21] Appl. No.: 228,113

[52] U.S. Cl. .............................. 198/35, 271/143
[51] Int. Cl. .................................... B65g 59/00
[58] Field of Search .......... 198/35, 63; 271/87, 44; 214/6 B, 6 A; 270/54

[56] References Cited
UNITED STATES PATENTS

| | | | |
|---|---|---|---|
| 2,930,476 | 3/1960 | Andrews | 198/35 |
| 2,867,437 | 1/1959 | Davy | 271/44 R |
| 2,872,020 | 2/1959 | Hansel et al. | 198/35 |

*Primary Examiner*—Evon C. Blunk
*Assistant Examiner*—Douglas D. Watts
*Attorney, Agent, or Firm*—Watson, Cole, Grindle & Watson

[57] ABSTRACT

This invention relates to an apparatus for assembling groups of storage battery plates comprising respective required numbers of positive plate separating devices, separator separating devices and negative plate separating devices provided with the racing devices conveying chains for conveying battery elements separated from these devices and composing them into unit plate groups while conveying them, a regulating mechanism for fixed plate groups and a delivering device for them as formed to be operatively connected with one another.

3 Claims, 9 Drawing Figures

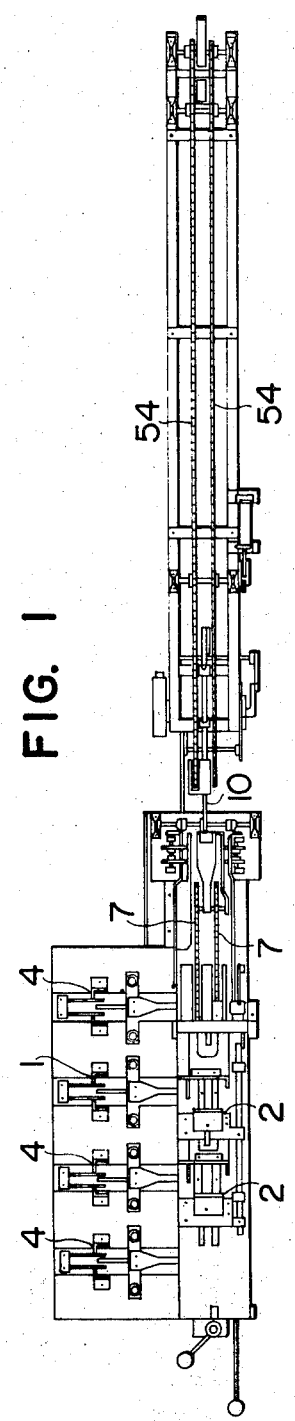
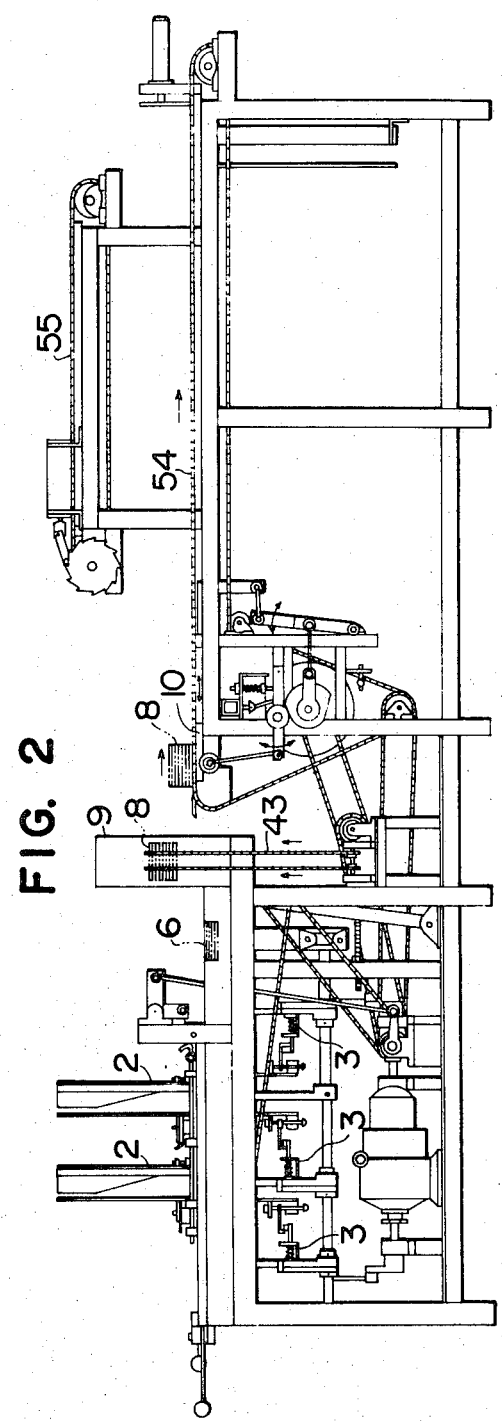

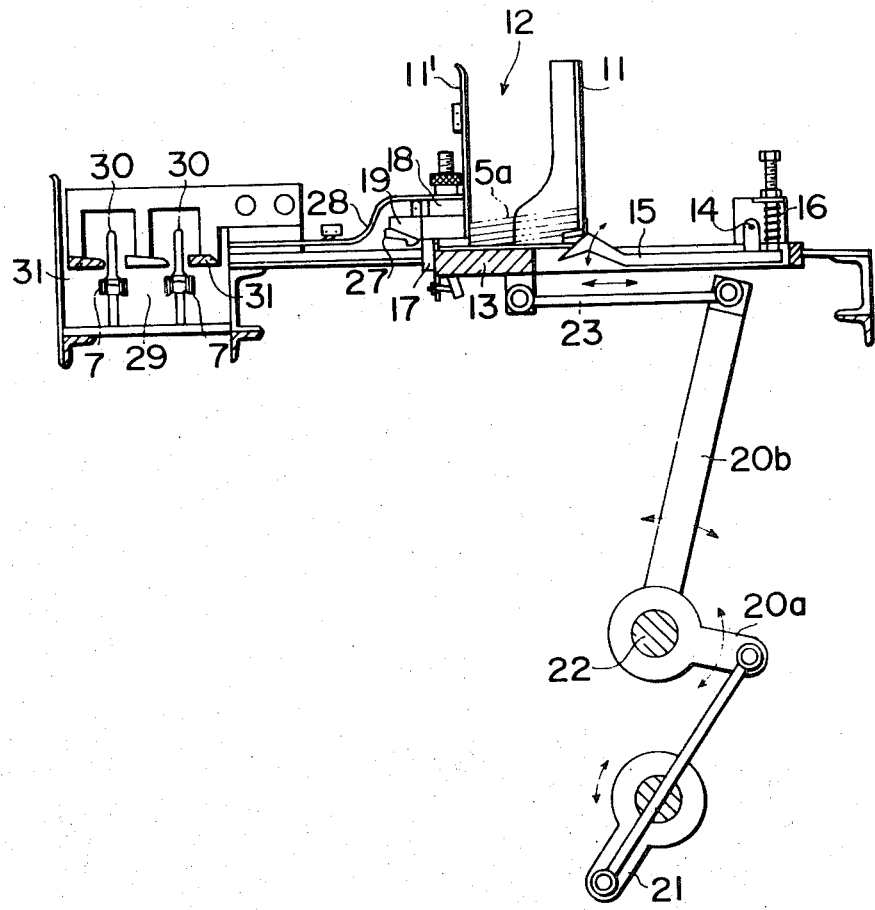

APPARATUS FOR ASSEMBLING GROUPS OF STORAGE BATTERY PLATES

This invention relates to a storage battery apparatus and more particularly to an improved apparatus for assembling groups of storage battery plates.

A first object of the present invention is to provide an apparatus for assembling groups of storage battery plates wherein required numbers of such storage battery elements such as positive plates, negative plates and separators are piled up properly to form unit plate groups, and further a required number of such unit plate groups are piled up to be automatically assembled into one storage battery plate group.

Another object of the present invention is to provide a storage battery plate group assembling apparatus wherein positive plate separating means, negative plate separating means, separator separating means, conveying chains, plate group regulating means and delivering means are mechanically integrally combined to be operatively connected.

A further object of the present invention is to provide a storage battery plate group assembling apparatus having a means of regulating the quantity of storage battery elements comprised of unit plate groups and negative plate separating means fitted particularly with racing means.

A still further object of the present invention is to provide a storage battery plate group assembling apparatus of a high efficiency resulting in reduced cost of the product made.

These objects of the present invention will be more readily understood from the following description with reference to the accompanying drawings.

FIG. 1 is a plan view of an apparatus for assembling groups of storage battery plates according to the present invention.

FIG. 2 is an elevation of the same.

FIG. 3 is an enlarged vertical sectional view of a plate separating means in FIG. 1.

Figure 5:
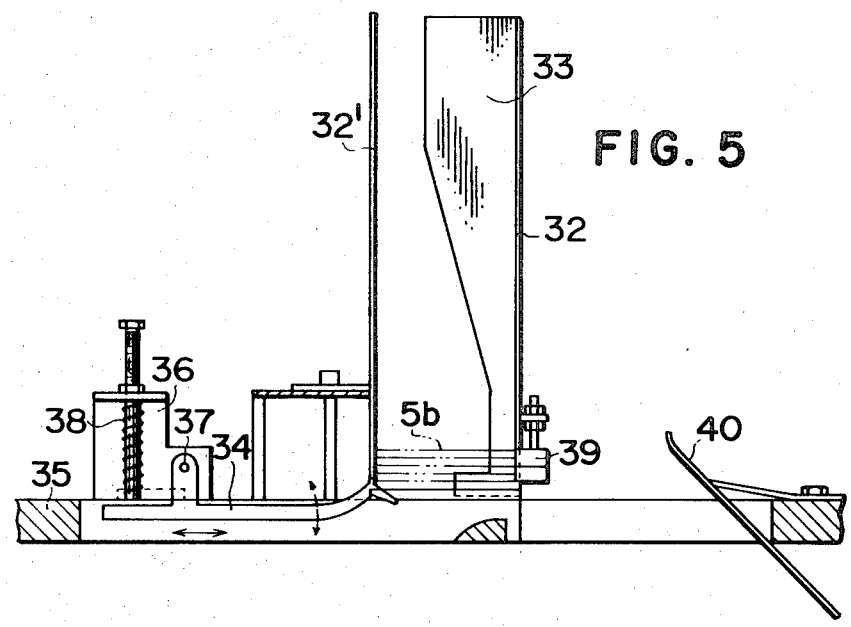
FIG. 5 is an enlarged vertical sectional view of a separator separating means.

In the drawings, 1 is a positive plate separating means in which, as shown in detail in FIG. 3, a box part 12 for plates 5a is formed of a hopper 11 and hopper end plate 11', a separating rod 15 is pivotally mounted by means of a shaft 14 to a guide plate 13 which is located below box 12 for horizontal sliding movement in the direction of the arrows. A spring 16 bears against one end of rod 15, and a pushing nail 17 is pivoted at the free end of guide plate 13 and is resiliently pressed forward, and a gate 18 is provided with a slit 19 so that the plates 5a supported by a supporting fixture fitted to the lower end of box 12 and by the above mentioned guide plate 13, may be taken out one by one through slit 19. 20a is a rocking lever for the driving part of the positive plate separating device designed to rock around a shaft 22 as a fulcrum with the rotation of a crank 21. Said rocking lever 20a is connected to guide plate 13 through a rocking lever 20b integral with this lever 20a, and a connecting rod 23. 27 is a stopper for preventing the return of the plates 5a after they are separated. 28 is a spring plate for preventing the plates from floating up. Thus, the positive plate separating means 1 and negative plate separating means 4 are provided parallel to one another at the side paths of a conveying path 29. Conveying chains 7 fitted with hooks 30 are stretched on the conveying path 29. Plate crossing forks 31 of separating means 1 and 4 are set above conveying chains 7. The hooks 30 are projected so as to be able to also move plates 5a on forks 31. As shown in FIG. 5, 2 is a separator separating means set above fork 31. 32 is a hopper of a separator 5b and forms a box 33 of a separator 5b together with a hopper end plate 32'. 34 is a separating rod pivotally mounted by means of a shaft 37 to a slider 36 which is mounted for reciprocating sliding on a base plate 35. The separating rod 34 is urged upwardly at a free end thereof by means of a spring 38. 39 is a slit, 40 is a guide, and 41 is an arranging plate.

Figure 4:
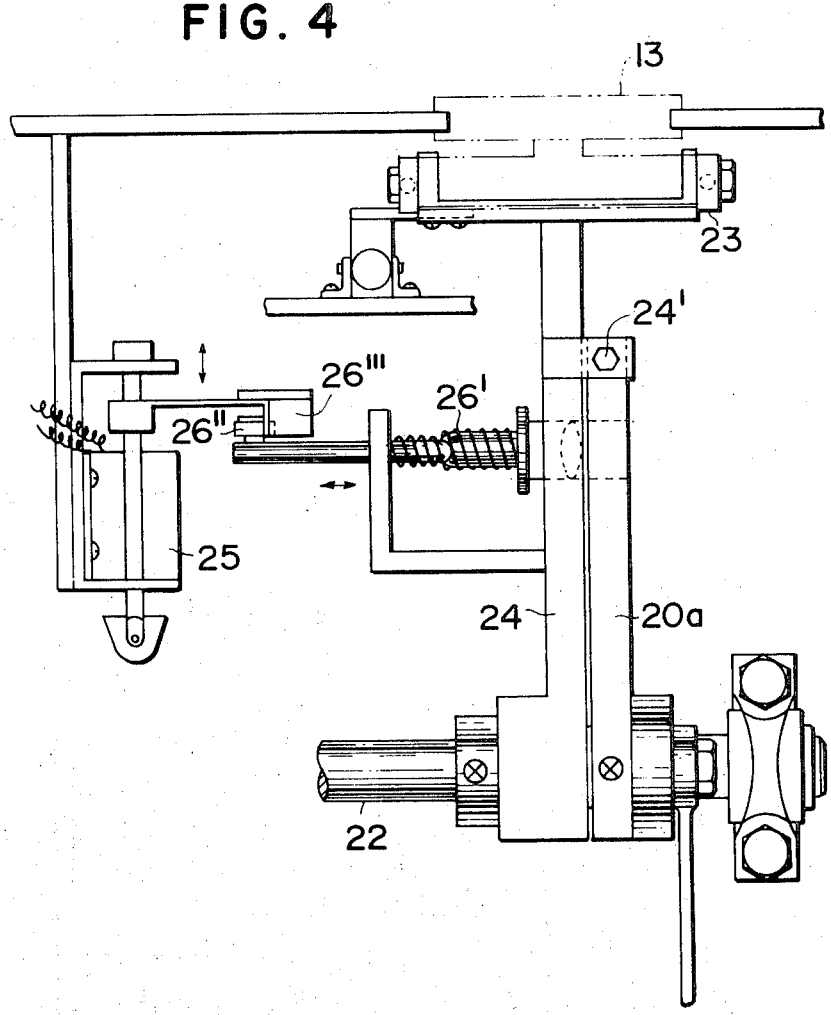
FIG. 4 is an enlarged elevational view of a racing means attached to a negative plate separating means.

The negative plate separating means 4 is of the same formation as of the positive plate separating means 1 but the driving part of the negative plate separating means 4 is provided with a racing means 3 for the plates as shown in FIG. 4. A swinging lever 24 is pivotally mounted on a rotary shaft 22 of a rocking lever 20a. 24' is a movement adjusting bolt held by the swinging lever 24. The bolt 24' is so made as to contact rocking lever 20a when rocking lever 20a returns. 26 is a clutch pin mounted for sliding movement in the direction of the arrows on swinging lever 24, and is pressed rightward in FIG. 4 of the drawing means of a spring 26' so as to be engageable with a notched hole in rocking lever 20a. 26' is a pin guide connected with an electromagnet 25. A guide roller 26''' of the clutch pin 26 is in resilient contact with the inside surface of pin guide 26'' so that pin guide 26'' may rise with the operation of electromagnet 25. Further, rocking lever 20a is so made as to rock with the rotation of crank 21 in FIG. 3. The swinging lever 24 is connected to guide plate 13 through a connecting rod 23. This guide plate 13 is located for horizontal sliding movement below a box 12' of the negative plate separating means 4. The separating rod 15 is pivotally mounted on shaft 14 to guide plate 13 and spring 16, bears against one end of the rod. Furthermore pushing nail 17 is pivoted at the free end of guide plate 13 and is resiliently pressed forward, and slit 19 is provided at the lower portion of box 12' so that plates 5a may be taken out one by one through slit 19. As shown in FIG. 3, shaft 14 is positioned above an extreme end of separating rod 15. Therefore, if a force for pushing out separating rod 15 is represented as a vector, a vertical component of force will always be exerted on the element to be separated (the separator or plate) so as to push it downwardly. Even if the friction force between slit 19 and the element to be separated is increased, the element to be separated will not be bent as it is pushed downwardly so that even if the element to be separated is of less rigidty, it will be smoothly passed through slit 19. On the contrary, if shaft 14 is positioned below the extreme end of the separating rod, a force for pushing the element to be separated upwardly will be generated so that the element to be separated may meet with a very high frictional resistance at slit 19, whereby no force to push out the element to be separated will be generated. Accordingly, an excessive force will be applied to the element to be separated so that it may be bent or broken in the box. Thus, it is one of the important features of the present invention that the element to be separated be pushed out by the force for pushing it downwardly.

Figure 7:
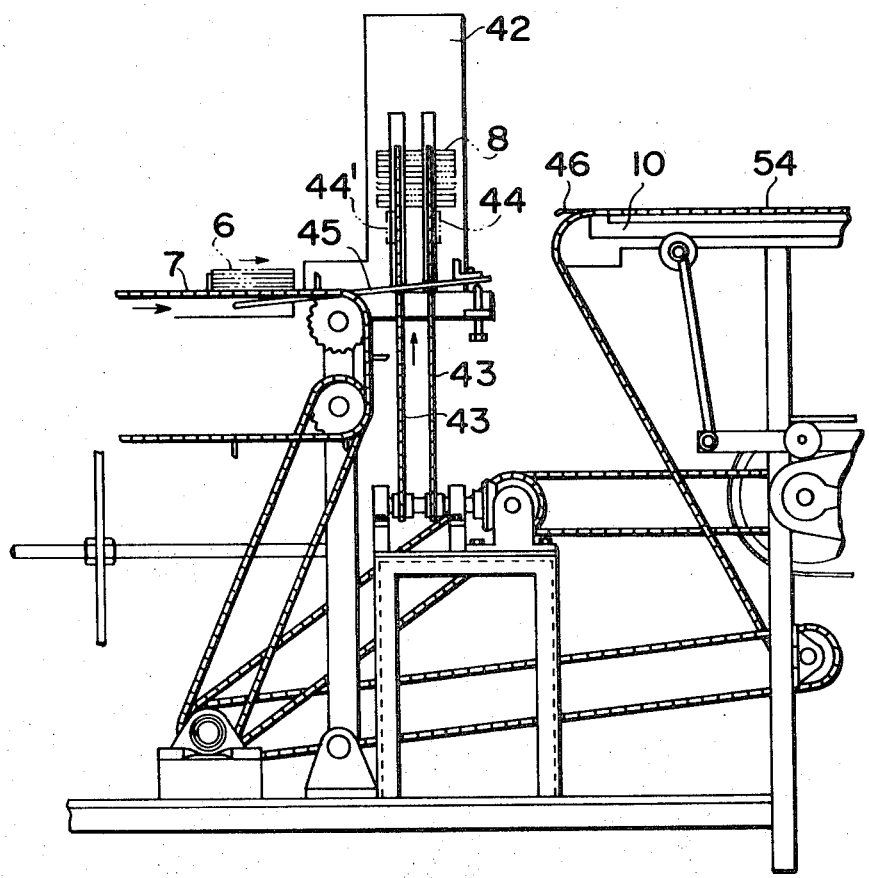
FIG. 7 is an enlarged side view of a plate group regulating means.
Figure 8:
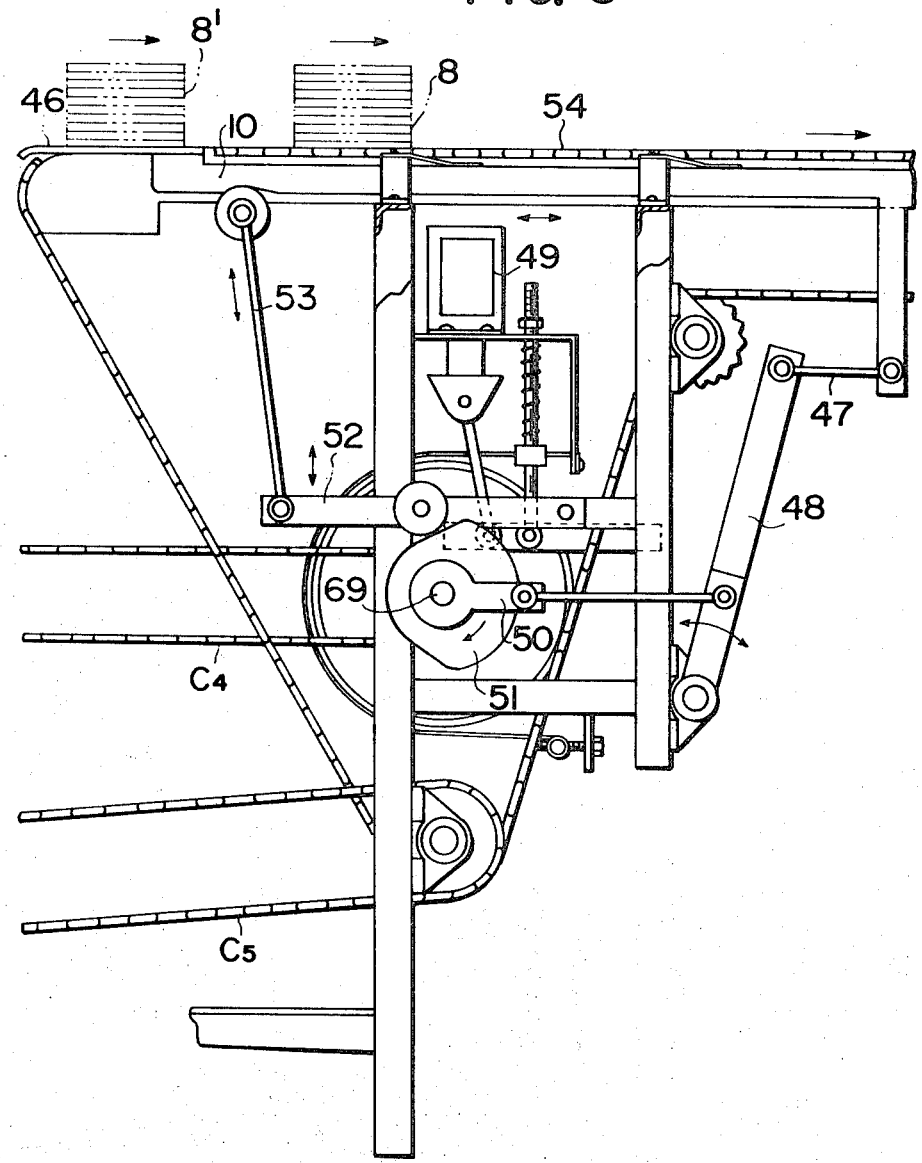
FIG. 8 is an enlarged side view of a means of delivering completed plate groups.
Figure 9:
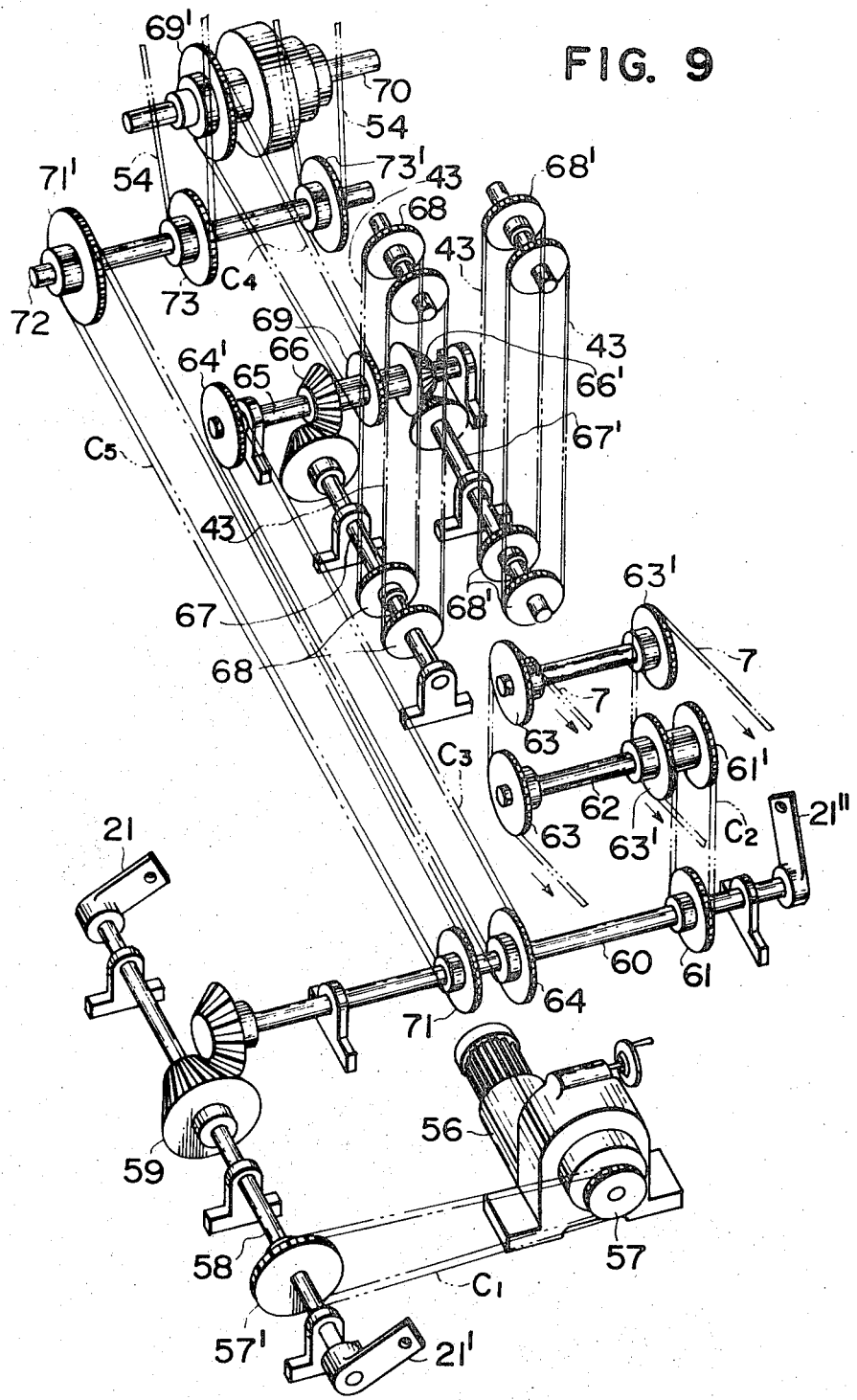
FIG. 9 is a perspective view showing a power transmitting mechanism of the storage battery plate group assembling apparatus of the present invention.

9 is a regulating means for fixed plate groups 8 as shown in FIG. 7 so that unit plate groups 6 may be piled up within guides 42 for piling up plate groups. Plate group piling chains 43 having inwardly extending hooks are stretched vertically toward guides 42 for piling up plate groups. Upwardly directed piling stoppers 44 and 44' are provided within guides 42 for piling up plate groups. A pushing stand 45 for unit plate groups 6 is set as inclined from the conveying path 29 over to the lower part of guide 42 for piling up plate groups. 10 is a delivering means for plate groups 8 as shown in FIG. 8. 46 is a delivering arm of delivering means 10 and is mounted for reciprocating sliding movement toward guide 42 for piling up plate groups. 48 is a rocking lever connected to delivering arm 46 through a connecting rod 47 and made to rock with the rotation of a crank 50 corresponding to an electromagnet 49. A rocking lever 52 is made to rock vertically with the rotation of a cam 51 fixed to crank 50 and is connected to delivering arm 46 through a connecting rod 53. 54 is a plate group conveying chain. 55 is an overflowing line attached to temporarily stock plate groups 8 which may remain on the plate group conveying chains 54 by accident. The above mentioned positive plate separating means 1, negative plate separating means 4, separator separating means 2, racing means 3, conveying chains 7, plate group regulating means 9, delivering means 10 and plate group conveying chain 54 are all properly operatively connected with one another by such mechanical power transmitting means as chains and sprockets and such electric transmitting means as electromagnets and limit switches. They are shown in FIG. 9. That is to say, when a variable speed motor 56 is driven, cranks 21 and 21' fixed to a shaft 58 will rotate through a sprocket 57, chain C₁, sprocket 57' and shaft 58. These cranks 21 and 21' will transmit the power respectively to the positive plate separating means and negative plate separating means. Further, a crank 21'' will rotate through shaft 58, miter gears 59 and a shaft 60 so as to transmit the power to the separator separating means. The power will be transmitted to conveying chains 7 through shaft 60, a sprocket 61, chain C₂, sprocket 61', shaft 62 and sprockets 63 and 63'. Then the power will be transmitted to piling chains 43 of the regulating means through shaft 60, a sprocket 64, chain C₃, sprocket 64', shaft 65, miter gears 66 and 66', shafts 67 and 67' and sprockets 68 and 68'. The power will be transmitted to the delivering means through shaft 65, a sprocket 69, chain C₄, sprocket 69' and shaft 70. The power will be transmitted to the plate group conveying chains 54 through shaft 60, a sprocket 71, chain C₅, sprocket 71', shaft 72 and sprockets 73 and 73'. Thus, the positive plate separating means, negative plate separating means provided with the racing means, separator separating means, plate group regulating means and delivering means can be operatively connected with one another.

Now the operation of the present invention shall be explained. In FIG. 3, when rocking lever 20a rocks, guide plate 13 will slide reciprocatingly. Therefore, by the going motion, the free end of separating rod 15 will separate plates 5a one by one through slit 19 while pushing plate 5a in the lowermost part of hopper 11 and then, by the next going motion, it will newly separate plates 5a one by one and pushing nail 17 will push out plate 5a separated in previous motion and will mount it on fork 31. Thus, the positive plate separating means 1 and negative plate separating means 4 will push out plates 5a as set. In such case, negative plate separating means 4 will properly race the plates. That is to say, one more of the negative plates than the positive plates is required for one plate group in the formation of the plate group. In some case, the negative plate is placed on each side of plate group. Further, the thickness of the negative plate located outside is different from the thickness of the negative plate located inside. For such reasons, it is necessary to race the negative plates as required.

Such racing means is carried out as follows. In FIG. 4, when electromagnet 25 operates with a signal from a shift register (not illustrated), clutch pin 26 will engage with rocking lever 20a and rocking of rocking lever 20a will be transmitted to swinging lever 24 to slide guide plate 13 reciprocatingly. However, when electromagnet 25 is not operated and the engagement of clutch pin 26 with rocking lever 20a is released, the racing will be made.

Figure 6:
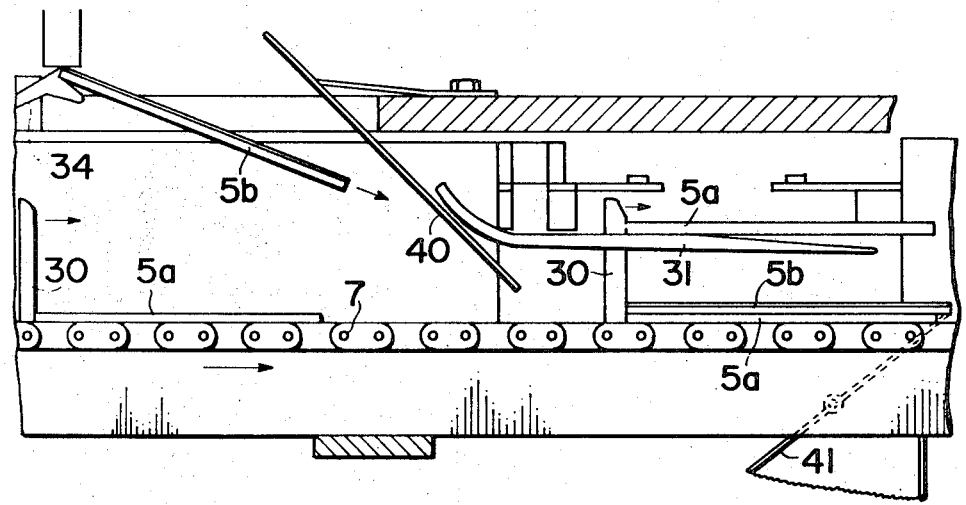
FIG. 6 is an enlarged vertical sectional view of an essential part of a conveying chain for assembling unit plate groups.

In FIG. 3, while being conveyed with hook 30 of conveying chain 7, plate 5a pushed out on fork 31 will be dropped on chain 7 from fork 31 and will then be conveyed. As shown in FIG. 6, separator 5b will be separated and dropped on the upper surface of plate 5a from separator separating means 2 through the clearance of fork 31. Such shown in detail in FIG. 5. As separating rod 34 reciprocates with slider 36 sliding reciprocatingly on base plate 35, separators 5b will be separated one by one through slit 39 with separating rod 34, and then this separator 5b will be guided by guide 40 and will drop onto the upper surface of plate 5a. In case the thus piled plates 5a and separators 5b are conveyed with hooks 30 and pass below the next fork 31, as shown in FIG. 6, plate 5a mounted on this fork 31 will be also conveyed and therefore, while being conveyed with conveying chains 7, the negative plate, separator, positive plate, separator and negative plate will be piled up in the order mentioned to form one unit plate group 6. Then, as the regulating means is shown in FIG. 7, unit plate groups 6 will be mounted on the hooks of plate group piling chains 43 through pushing stand 45, will be moved upward in turn within guides 42 so that a fixed number of sets of unit plate groups 6 may be piled up above piling stoppers 44 to form plate group 8. Then this plate group 8 will be delivered onto the next plate group conveying chains 54 with delivering means 10. Such shown in detail in FIG. 8. That is to say, when the fixed piling up of the unit plate groups 6 is completed, electromagnet 49 will operate with a signal from the shift register (not illustrated), crank 50 will make one rotation correspondingly. Therefore rocking lever 48 will rock and delivering arm 46 will reciprocate. On other hand, as cam 51 makes one rotation integrally with crank 50, rocking lever 52 will rock vertically to move free end of delivering arm 46 up and down. As a result, delivering arm 46 will reach the bottom of plate group 8 within guides 42 for piling up the plate groups by the going slide of arm 46 and will lift plate group 8 and return in the case of the returning slide. Therefore plate group 8 will be transferred onto plate group conveying chains 54 and then will be taken out in turn with plate group conveying chains 54.

In the present invention, all the respective means of separating respective storage battery elements, composing unit plate groups, forming fixed plate groups and delivering them are combined to be automated as in the above and therefore the efficiency is so high that the reduction of the cost of the product can be expected. Particularly, the negative plate separating means is provided with the racing means so taht the negative plate separation may be properly raced. Therefore, the using number, position and thickness of the negative plates can be simply and quickly changed in one apparatus. Further, as one positive plate separating means, one or more separator separating means and a plurality of negative plate separating means are set in parallel, unit plate groups will be composed in turn while the separated storage battery elements are conveyed in one direction and therefore the speed of the production can be increased. Further, as the unit plate group is composed on the conveying chain, the storage battery elements in the upper layers can be laminated in order on the upper surface of the storage battery element while being conveyed with the conveying chains, therefore the unit plate group can be composed simply and easily and it is possible to neatly arrange the laminated state while being conveyed.

Further, as the respective means are operatively connected with one another, the respective operations will be made as related with one another. Thus the present invention provides a storage battery plate group assembling apparatus having advantages that accurate and positive operations can be obtained and that the driving power transmitting mechanism can be economized.

While only a single embodiment of the present invention is shown, it is apparent that the apparatus described is subject to modification without departing from the spirit of the invention. Therefore, the present invention should not be limited by the disclosure set forth herein but only by the scope of the appended claims.

What is claimed is:

1. An apparatus for assembling groups of storage battery plates comprising respective required numbers of positive plate separating means, separator separating means and negative plate separating means provided with racing means, conveying chains for conveying battery elements separated from said means and composing them into unit plate groups while conveying them, a regulating means for fixed plate groups and a delivering means for said groups, each of said separating means being provided with a separating rod fitted to a guide plate mounted for reciprocating sliding movement, said separating rod being pivotally mounted on an axis located above an extreme end thereof and urged by means of a spring, a battery element accommodating box disposed above said separating means, an end of said separating rod being carried by a supporting fixture provided at a lower end of said battery element accommodating box, said accommodating box containing one of a group of separators, positive plates and negative plates, and another end being formed to separate the battery elements on said guide plate, said axis being located above the point of contact between said separating rod and battery element each of said means being formed to be operatively connected with one another.

2. A storage battery plate group assembling apparatus according to claim 7 provided with the negative plate separating means provided with the racing means further comprising a swinging lever pivotally mounted for rotation on a rotary shaft, a guide plate connected with said swinging lever, a rocking lever mounted for rotation on said rotary shaft, a clutch pin mounted for sliding movement on said swinging lever, a notched hole in said rocking lever, said swinging lever being capable of movement to a predetermined extent in relation to said rocking lever by the respective engagement and disengagement of said clutch pin with said notched hole.

3. A storage battery plate group assembling apparatus according to claim 1 wherein vertically moving conveying chains are provided vertically at the end of conveying chains, a regulating means is provided to pile up any required number of the unit plate groups by said vertically moving conveying chains so as to form a fixed plate group and a plate group delivering means is provided to take up and deliver said required number of plate groups by a deliverying arm operated by a horizontal rocking lever and a vertical rocking lever.

* * * * *